Patented Dec. 25, 1951

2,580,358

UNITED STATES PATENT OFFICE 2,580,358

METHOD FOR STORING PERHALOACETYL PEROXIDE AND STABILIZED PERHALO-ACETYL PEROXIDE

William T. Miller, Ithaca, N. Y., Albert L. Dittman, Jersey City, N. J., and Sherman K. Reed, Lewisburg, Pa., assignors to the United States of America as represented by the United States Atomic Energy Commission No Drawing. Application May 17, 1948, Serial No. 27,614

7 Claims. (Cl. 260—610)

This invention relates to polymerization promoters adapted to be used in promoting the polymerization of halogenated olefins and more particularly to a novel group of halogenated acetyl peroxides, polymerization promoters incorporating such acetyl peroxides and methods of making such acetyl peroxides.

In the polymerization of halogenated olefinic compounds, it is usually desirable to incorporate in the reaction mixture chemical promoters which aid in initiating, maintaining and controlling the polymerization reaction. Promoters such as organic peroxides, e. g., acetyl peroxide, benzoyl peroxide and the like have been used to promote polymerization reactions of this type. Polymerization promoters differ from catalysts in that they enter into the chemical reaction that they promote and fragments of the promoter become part of the finished polymer. Thus the chemical structure of the promoter affects, in some measure, the structure and properties of the polymer.

In recent years, there has been considerable interest in polymers formed from perhalogenated olefins such as trifluorochloroethylene and tetrafluoroethylene. Such polymers may be either liquids or solids. They have a high degree of chemical and thermal stability and are of special interest because of their unusual resistance to chemical attack by chlorine, fluorine and their compounds. It has been found, however, that when perhalogenated olefinic monomers are polymerized in the presence of organic promoters such as acetyl peroxide or benzoyl peroxide, hydrogen-containing fragments of these promoters become incorporated in the polymeric product and may affect adversely the ability of the product to withstand chemical attack by the halogens and their compounds. The presence of even a small percentage of hydrogen in the polymeric product may result in an appreciable reduction in the corrosion resistance of the polymer, particularly its resistance to elemental fluorine.

It is accordingly an object of the present invention to provide an organic peroxide promoter that is capable of promoting the polymerization of perhalogenated olefins and is at the same time completely free from hydrogen.

It is another object of the invention to provide a polymerization promoter containing a hydrogen-free peroxide and which is in liquid form so that it may be more easily and safely stored and more easily and effectively incorporated in the polymerization reaction mixture.

It is another object of the invention to provide a novel group of perhalogenated peroxides useful as polymerization promoters.

It is still another object of the invention to provide a method for making such peroxides.

It is a still further object of the invention to provide a group of per halogenated peroxides that are especially useful in the low temperature polymerization of perhalogenated olefins to produce high molecular weight solid products, e. g., plastics.

Other objects of the invention will be in part obvious and in part pointed out hereinafter.

We have discovered that the perhalogenated olefinic monomers can be polymerized to yield products of exceptional stability when the polymerization reaction is carried out in the presence of a polymerization promoter comprising a perhalo-acetyl peroxide. Since the perhalo-acetyl peroxides contain no hydrogen, fragments of the promoter that may become incorporated in the polymeric product do not diminish the stability of the product and its ability to resist chemical attack by the halogens and their compounds. Various perhalo-acetyl peroxides may be used such as, for example, bis-trichloro-acetyl peroxide, bis-trifluoro-acetyl peroxide and bis-dichlorofluoro-acetyl peroxide. In some cases as for example where the polymeric product is to be used in contact with elemental fluorine, it is preferable to use a fluorine-containing promoter. Thus if a perhalofluoro-acetyl peroxide, such as the bis-trifluoro- or dichlorofluoro-acetyl peroxide is used, greater stability is achieved than if the bis-trichloro- compound is used.

The perhalogenated acetyl peroxides of the present invention may, in general, be conveniently prepared by causing a perhalogenated acetic acid derivative to react with an aqueous solution of an inorganic peroxide selected from the group consisting of alkali metal and alkaline earth metal peroxides. It has been found that the perhalo-acetyl peroxides tend to be unstable at ordinary room temperatures and above, and hence it is desirable, from the point of view of both safety and obtaining a satisfactory yield of the product, to carry out all steps of the process at a temperature at least as low as room temperature and preferably substantially below room temperature. Satisfactory yields of the product may be obtained by dissolving the inorganic peroxide in an aqueous solution of a suitable freezing point depressant and carrying out the reaction between the perhalo derivative of acetic acid and the inorganic peroxide at a temperature between the freezing point of the solution and 20° C. and preferably at a temperature below 0° C.

The particular perhalo derivative of acetic acid used depends to some extent on the peroxide desired. We have found that the bis-trichloro- and bis-dichlorofluoro-acetyl peroxide may be conveniently prepared from the corresponding acetyl chloride whereas the bis-trifluoro-acetyl peroxide is preferably prepared from the corresponding acetic anhydride. The peroxide products are solid materials and must be maintained at relatively low temperatures, i. e., temperatures below about 0° C. in order to maintain their stability. Since the products are sensitive to shock and sometimes decompose with explosive violence, it is important that they be stored and used at these low temperatures. In order to facilitate storage of the peroxides and their incorporation into polymerization reaction mixtures, we have found it desirable to dissolve them at the time they are prepared in a suitable halogenated organic solvent, for example, a chlorofluorinated organic solvent such as trichlorofluoromethane. The peroxide when dissolved in such a solvent to the extent of say 2% by weight can be effectively and safely stored at a reduced temperature over considerable periods of time without appreciable deterioration.

In order to point out more fully the nature of the present invention, the following specific examples are given to illustrate compounds falling within the scope of the invention and methods by which such compounds may be made.

Example I

About 20 gms. of sodium chloride was dissolved in 100 cc. of distilled water in a reaction flask provided with a low temperature thermometer and a high speed mechanical stirrer. The resulting brine solution which contained about 20% by weight of NaCl was cooled to about —15° C. by surrounding the flask with an alcohol-water mixture containing equal volumes of alcohol and water and chilled with Dry Ice to about —20° C. In this cooled brine solution 4.7 gms. of chemically pure sodium peroxide was dissolved. After the peroxide was dissolved and the temperature equilibrium re-established, 18 gms. of trichloro-acetyl chloride, which had been previously cooled to about —15° C., was added to the contents of the reaction flask and the reaction mixture stirred for about one hour while maintaining the temperature between —10° C. and —15° C.

The bis-trichloro-acetyl peroxide was thrown down as a fine flocculent precipitate and separated by filtering the reaction mixture through a Buchner funnel that had been cooled to 0° C. Upon completion of the filtration, the precipitate was washed quickly with small portions of 0° C. distilled water.

The precipitate was purified by recrystallization from trichlorofluoromethane (Freon 11) by adding the cooled solvent to the precipitate and allowing the solution to warm for a short time with stirring to dissolve the precipitate. When the resulting solution was again cooled, the perhalo peroxide crystallized out as a mass of fine fluffy lustrous crystals which were recovered as before by filtering.

When purified to the desired extent, the peroxide was dissolved in a further quantity of trichlorofluoromethane to form a 2% solution in which condition it can be effectively and safely stored. The yields of the peroxide obtained represented about 50% to 80% of the theoretical amount that is obtainable.

Example II

An aqueous sodium chloride brine was prepared as in Example I and 2 gms. of sodium peroxide dissolved therein. The brine solution was cooled to —15° C. and 7 gms. of dichlorofluoro-acetyl chloride added to the brine with vigorous stirring. The resulting solution was maintained at about —10° C. and allowed to settle, whereupon a liquid layer having a density close to that of the aqueous layer separated. This liquid layer when heated decomposed with sputtering, thus indicating the presence of an organic peroxide.

The reaction mixture was extracted with ether and the extract cooled to Dry Ice temperature, whereupon crystallization occurred. Crystals containing the bis-dichlorofluoro-acetyl peroxide were recovered by filtration.

Example III

A solution of bis-trifluoro-acetyl peroxide in trichlorofluoro-methane was prepared as follows: 14.3 gms. of trifluoro acetic anhydride were dissolved in 160 cc. of chemically pure ethyl ether at —15° C. and reacted with an aqueous suspension of 6.5 gms. of 88% barium peroxide. The ether solution was added to the barium peroxide suspension in small amounts over a period of about 5 minutes. It was found that the reaction mixture tended to heat up upon each addition of ether solution and hence the ether solution was added slowly in order to avoid undue heating of the reaction mixture with resultant decomposition of the peroxide product.

The mixture was stirred constantly at about —10° C. for about 30 minutes to keep the alkaline earth metal peroxide in suspension and was subsequently allowed to settle for about 20 minutes while the temperature was maintained at about —20° C. The supernatant liquid was decanted and the residue was washed with an additional portion of 100 cc. of ether. The two extracts were combined and analyzed and found to contain a quantity of bis-trifluoro-acetyl peroxide representing a yield of 58.5%.

About 10 cc. of this ether solution was concentrated by distillation under a reduced pressure and washed with trichlorofluoromethane to remove the last traces of ether. The concentrated solution was cooled with Dry Ice to crystallize out the product which was recovered by filtration and dissolved in a further quantity of trichlorofluoromethane.

As indicated above, the products of the present invention are characterized by considerable thermal instability and are capable of decomposing with explosive violence. Hence they can be safely handled only at relatively low temperatures, and careful manipulation at temperatures below 0° C. is required to prepare satisfactory yields of these products. The products have an appreciable rate of decomposition at ordinary temperatures, and to preclude undue deterioration in storage, it is preferable that the products be dissolved in a suitable solvent such as trichlorofluoromethane and maintained at relatively low temperatures until they are to be used. In general the fluorine-substituted peroxides are more stable than the chlorinated peroxides and this difference in stability affects both the temperature at which they are used and the temperature at which they are stored. For example, bis-trifluoro-acetyl peroxide may be advantageously used as a polymerization promoter at temperatures of the order of 25° C. and may be safely stored at temperatures of the order of −20° C. On the other hand, bis-trichloro-acetyl peroxide is particularly effective as a promoter at 0° C. or below and is desirably stored at Dry Ice temperatures (−78° C.).

The products of the present invention may be used to promote the polymerization of monomers comprising perhalogenated olefins to give either liquid or solid polymeric products that the unusually resistant to the action of chlorine, fluorine and their compounds. The present products are especially useful in low temperature polymerization reactions such as those disclosed in our co-pending application, Serial No. 773,292, filed September 10, 1947, wherein high molecular weight plastics are produced. However they may also be used in other processes for producing highly resistant polymeric products. As indicated above, in carrying out the low temperature polymerization reactions it is preferable to use the chlorine-substituted rather than the fluorine-substituted peroxides since the decomposition rate of the chlorine-substituted products is greater at these low reaction temperatures.

Since many embodiments might be made of the present invention and since many changes might be made in the embodiment described, it is to be understood that the foregoing description is to be interpreted as illusrative only and not in a limiting sense.

We claim:

1. A method of storing a perhalo acetyl peroxide which comprises dissolving said peroxide immediately after it has been prepared in a solvent which is a perhalomethane, and maintaining the resulting solution at a sub-zero temperature until said peroxide is to be used.

2. A method of storing a perhalo acetyl peroxide which comprises dissolving said peroxide immediately after it has been prepared in a solvent which is trichlorofluoro methane, and maintaining the resulting solution at a temperature no higher than −20° C. until said peroxide is to be used.

3. A perhalo acetyl peroxide composition of improved stability, said composition comprising a solution of a perhalo acetyl peroxide in a solvent which is a perhalomethane.

4. A perhalo acetyl peroxide composition of improved stability, said composition comprising a solution of a perhalo acetyl peroxide in a solvent which is trichlorofluoro methane.

5. A composition according to claim 2 and wherein said peroxide is bis-trichloro-acetyl peroxide.

6. A composition according to claim 2 and wherein said peroxide is bis-dichlorofluoro-acetyl peroxide.

7. A composition according to claim 2 and wherein said peroxide is bis-trifluoro-acetyl peroxide.

WILLIAM T. MILLER.
ALBERT L. DITTMAN.
SHERMAN K. REED.

REFERENCES CITED

The following references are of record in the file of this patent:

UNITED STATES PATENTS

| Number | Name | Date |
|---|---|---|
| 1,913,775 | Straub | June 13, 1933 |
| 2,379,390 | Tuerck | June 26, 1945 |
| 2,414,769 | Rust | Jan. 21, 1947 |
| 2,439,399 | Shanley et al. | Apr. 13, 1948 |
| 2,458,207 | Rudolph et al. | Jan. 4, 1949 |
| 2,462,042 | Howald et al. | Feb. 15, 1949 |

FOREIGN PATENTS

| Number | Country | Date |
|---|---|---|
| 369,725 | Great Britain | Mar. 31, 1932 |

OTHER REFERENCES

Beilstein, 4th edition, vol. 2, page 199 (1920).

Vanino et al., Ber., vol. 33, pages 1043 to 1045 (1900).

Price et al., J. A. C. S., vol. 64, pages 1103 to 1106 (1942).